(12) United States Patent
Dyngosz et al.

(10) Patent No.: US 11,966,845 B1
(45) Date of Patent: Apr. 23, 2024

(54) SERVICE DOCUMENT GENERATION USING LARGE LANGUAGE MODELS

(71) Applicant: Halliburton Energy Services, Inc., Houston, TX (US)

(72) Inventors: Mateusz Michal Dyngosz, Houston, TX (US); Charles Benjamin Broaddus, Houston, TX (US); Aidan Porter, Aberdeen (GB); Dale E. Jamison, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/222,907

(22) Filed: Jul. 17, 2023

(51) Int. Cl.
*G06E 1/00* (2006.01)
*G06N 3/08* (2023.01)

(52) U.S. Cl.
CPC ..................................... *G06N 3/08* (2013.01)

(58) Field of Classification Search
CPC ........................................................ G06N 3/08
See application file for complete search history.

(56) References Cited

U.S. PATENT DOCUMENTS

| | | | |
|---|---|---|---|
| 8,682,478 B2 | 3/2014 | Kechel | |
| 10,876,391 B2 | 12/2020 | Williams et al. | |
| 11,053,792 B2 | 7/2021 | Williams et al. | |
| 11,085,273 B2 | 8/2021 | Williams et al. | |
| 11,091,989 B1 | 8/2021 | De Oliveira et al. | |
| 11,346,203 B2 | 5/2022 | Jamison et al. | |
| 11,680,477 B1 | 6/2023 | Guo et al. | |
| 2013/0251237 A1 | 9/2013 | Cao et al. | |
| 2019/0171187 A1 | 6/2019 | Cella et al. | |
| 2019/0292908 A1 | 9/2019 | Karimi Vajargah et al. | |
| 2020/0110589 A1* | 4/2020 | Bequet | G06F 16/164 |
| 2020/0284143 A1 | 9/2020 | Lopes Pereira et al. | |
| 2021/0005195 A1 | 1/2021 | Tao et al. | |
| 2021/0238938 A1 | 8/2021 | Jamison et al. | |
| 2022/0316310 A1 | 10/2022 | Mohsenian et al. | |

FOREIGN PATENT DOCUMENTS

CN 111479982 B * 1/2023 ............. E21B 21/08

* cited by examiner

*Primary Examiner* — Xin Jia

(74) *Attorney, Agent, or Firm* — Michael Jenney; C. Tumey Law Group PLLC

(57) ABSTRACT

A method for creating generated formatted data, that includes receiving, by a sequential data generator, raw data, where the raw data includes formation data at a drilling environment, processing the raw data to obtain generated recommendation data, where the generated recommendation data includes a proposed drilling location, and creating the generated formatted data, where the generated formatted data includes the generated recommendation data.

20 Claims, 9 Drawing Sheets

US 11,966,845 B1

SERVICE DOCUMENT GENERATION USING LARGE LANGUAGE MODELS

BACKGROUND

The oil and gas industry may use wellbores as fluid conduits to access subterranean deposits of various fluids and minerals which may include hydrocarbons. A drilling operation may be utilized to construct the fluid conduits which are capable of producing hydrocarbons disposed in subterranean formations. Wellbores may be incrementally constructed as tapered sections, which sequentially extend into a subterranean formation.

The widest diameter sections may be located near the surface of the earth while the narrowest diameter sections may be disposed at the toe of the well. For example, starting at the surface of the earth, the borehole sections which make up a wellbore may include any combination of a conductor borehole, one or more surface boreholes, one or more intermediate boreholes, a pilot borehole, and/or a production borehole. The diameter of the foregoing wellbore sections may sequentially decrease in diameter from the conductor borehole to the production borehole.

BRIEF DESCRIPTION OF DRAWINGS

These drawings illustrate certain aspects of some examples of the present disclosure and should not be used to limit or define the disclosure.

DETAILED DESCRIPTION

Overview and Advantages

In some examples, prior to executing a drilling operation, it may be beneficial to construct a drilling plan which incorporates multi-disciplinary data including engineering and geological data. In general, this application discloses one or more embodiments of methods and systems for which utilize a sequential data generator which may include large language models ("LLMs") to aid in the creation of different types of data.

For a drilling environment, a "design of service" (DoS) document (also known as a "basis of design") may be generated that may include a comprehensive plan for well construction. Non-limiting examples of the information included in a DoS are (i) wellbore design (e.g., trajectory, casing design, setting points, cement design), (ii) required equipment for the design constraints (e.g., tools that can withstand minimum torques/forces/temperatures, tool build rate limitations, tools capable of operating in specified chemical environments), (iii) fluid design (e.g., mud properties, displacement procedures, hydraulic calculations, etc.), (iv) contingency plans, (v) regional availability of equipment, including offerings from various service providers and associated costs, and (vi) safety protocols and operating parameters (e.g., the safety ratings for equipment (pressure, temperature, fatigue)).

In some examples, preparing a DoS may include acquiring, processing, and analyzing data for the drilling environment. Additionally, in further examples, preparing a DoS may involve considerable effort and time from a multi-disciplinary team with specialized technical expertise. Due to the length of the DoS and the number of individuals involved, a DoS may include errors that delay execution of the construction and operations of the well. Accordingly, preparation of a DoS may be an expensive and time consuming process.

To reduce the time, effort, expense required to generate a DoS, it may be desirable to automate more of the processes used to prepare the document. Further, such automation reduces any errors therein by removing opportunities for human mistakes. Human resources may be diverted to additional review, validation, and modifications to the DoS (instead of preparation).

Automating such tasks has—historically—been too complicated for a computing system to handle. However, due to the availability of information handling systems capable of generating machine learning processes, deep learning models, and LLMs, it has become possible to create software that can automate intellectually demanding tasks.

As disclosed in herein, one or more systems and methods are provided that may be created specifically for the purpose of processing "raw data" to generate "formatted data". Such processes cover multiple steps required to generate a DoS document (after gathering the raw data) from the drilling environment. Accordingly, human effort (and therefore time and cost) may be significantly reduced in order to prepare a DoS.

FIG. 1

Figure 1:
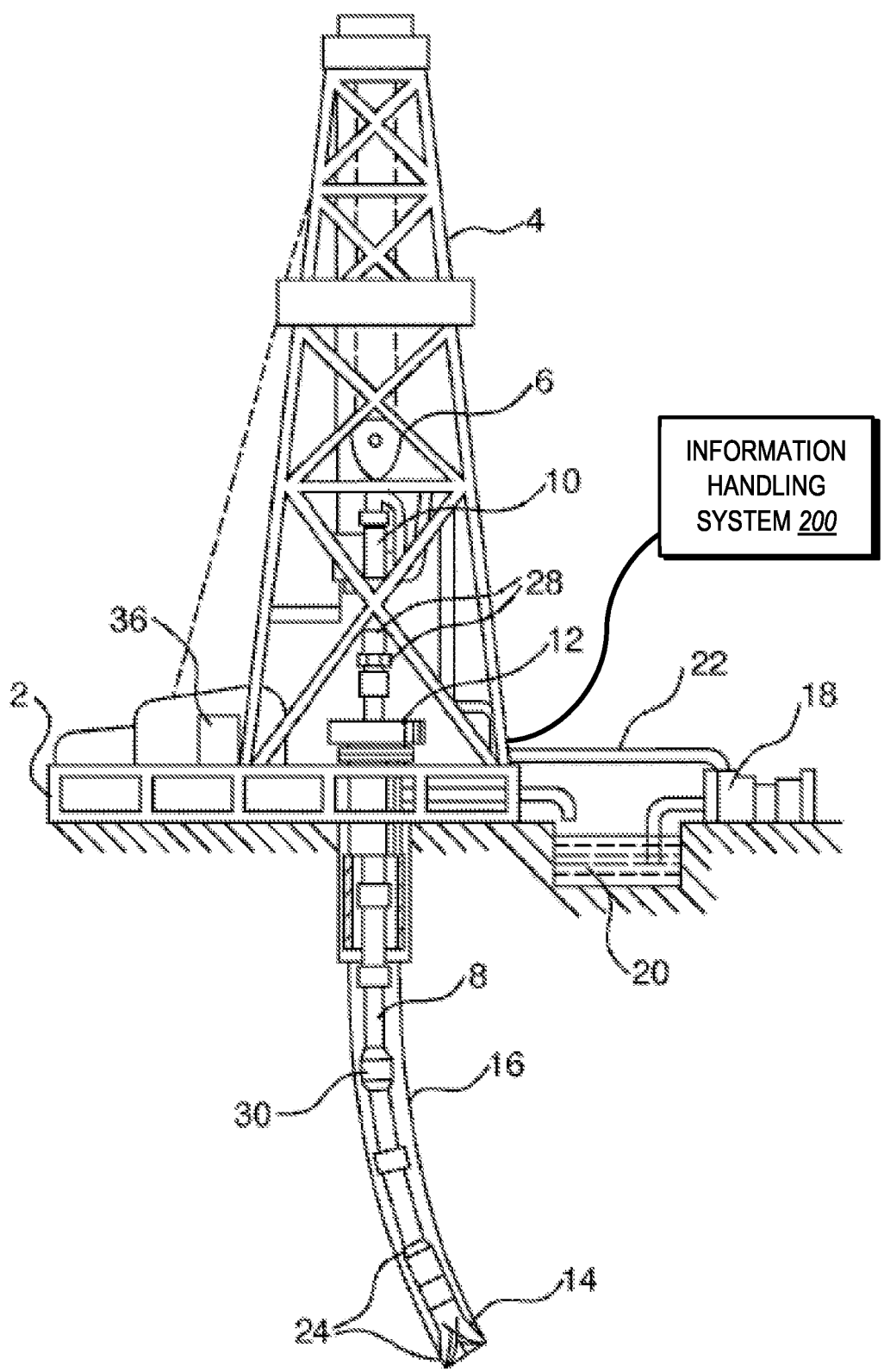
FIG. 1 is a diagram of one or more aspects of a drilling environment.

FIG. 1 is a diagram of one or more aspects of a drilling environment. Drilling platform 2 supports derrick 4 having a traveling block 6 for raising and lowering drillstring 8. Top drive 10 supports and rotates drillstring 8 as it is lowered through wellhead 12. Drill bit 14 may be driven by a downhole motor and/or rotation of drillstring 8. As bit 14 rotates, it creates wellbore 16 that passes through various strata of the subterranean formation. Pump 18 circulates drilling fluid 20 through feed pipe 22, through the interior of drillstring 8 to drill bit 14. The fluid exits through orifices in drill bit 14 and flows upward through the annulus around drillstring 8 to transport drill cuttings to the surface, where the fluid may be filtered and recirculated.

Drill bit 14 may be just one piece of bottom-hole assembly 24 that includes a mud motor and one or more "drill collars" (thick-walled steel pipes) that provide weight and rigidity to aid the drilling process. In any embodiment, bottom-hole assembly 24 may include a telemetry sub to maintain a communications link with the surface. Mud pulse telemetry may be one common telemetry technique for transferring tool measurement data to surface receivers and receiving commands from the surface, but other telemetry techniques can also be used. As a non-limiting example, a technique for transferring tool measurement data to the surface and receiving commands from the surface may include through-wall acoustic signaling, wherein drillstring 8 may include one or more repeater(s) 30 to detect, amplify, and re-transmit signals both from the bottom of wellbore 16 to the surface, and from the surface to bottom-hole assembly 24. At the surface, transducers 28 may convert signals between mechanical and electrical form, enabling network interface module 36 to receive the uplink signal from the telemetry sub and transmit a downlink signal to the telemetry sub.

Information handling system 200 may be operatively connected to drillstring 8 (and/or other various components of the drilling environment). Information handling system 200 may receive a digital telemetry signal, demodulate the signal, and display the tool data or well logs to a user. Information handling system 200 may process the signals, and the information contained therein may be displayed for an operator to observe and stored for future processing and reference. Alternatively, signals may be processed downhole prior to receipt by information handling system 200. Although FIG. 1 depicts information handling system 200 as being hardwired to one or more components of the drilling environment, it should be appreciated that information handling system 200 may utilize wireless communications.

FIG. 2A

Figure 2A:
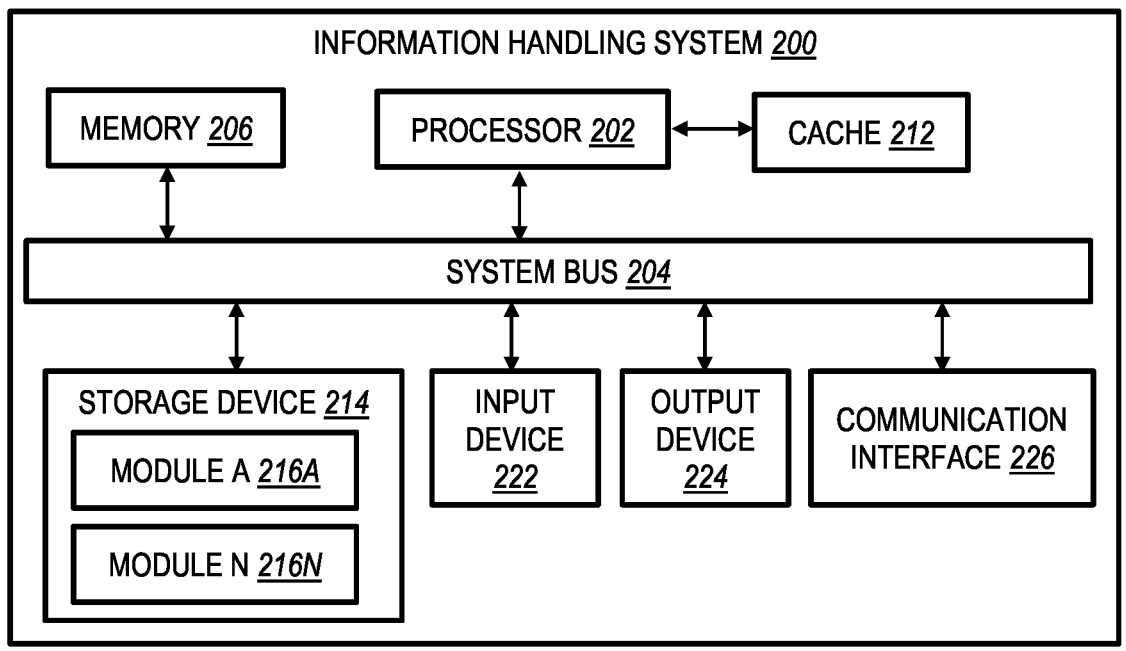
FIG. 2A is a diagram of an example information handling system.

FIG. 2A is a diagram of an example information handling system which may be utilized to perform various steps, methods, and techniques disclosed herein. As illustrated, information handling system 200 includes processor 202 and system bus 204 that operatively connects processor 202 to one or more other component(s) of information handling system 200. Other components of information handling system 200 may include (i) memory 206, (ii) storage device 214, (iii) input device 222, (iv) output device 224, and (v) communication interface 226. These other components may control or be configured to control processor 202 to perform various operations or actions. Each component described is depicted and disclosed as individual functional components. However, these individual components may be combined (or divided) into fewer (or more) components in any possible combination or configuration.

Non-limiting examples of information handling system 200 include a general purpose computer (e.g., a personal computer, desktop, laptop, tablet, smart phone, etc.), a network device (e.g., switch, router, multi-layer switch, etc.), a server (e.g., a blade-server in a blade-server chassis, a rack server in a rack, etc.), a controller (e.g., a programmable logic controller (PLC)), and/or any other type of information handling system 200 with the aforementioned capabilities. Further, information handling system 200 may be operatively connected to another information handling system 200 via a network in a distributed computing environment. As used herein, a "computing device" may be equivalent to an information handling system.

Processor 202 may be an integrated circuit configured to process computer-executable instructions (e.g., code, algorithms, software) and may take the form of any general-purpose processor (e.g., a central processing unit (CPU)). Processor 202 may execute (e.g., read and process) computer-executable instructions stored on storage device 214, memory 206, and/or cache 212. Processor 202 may be a self-contained computing system, containing multiple cores or processors, a bus, memory controller, cache, etc. Processor 202 may include multiple processors, such as a system having multiple, physically separate processors in different sockets, or a system having multiple processor cores on a single physical chip. A multi-core processor may be symmetric or asymmetric. Further, processor 202 may include multiple distributed processors located in multiple separate computing devices but configured to operate together via a communications network. Multiple processors or processor cores may share resources such as memory 206 or cache 212 or may operate using independent resources.

Non-limiting examples of processor 202 include one or more state machines, an application specific integrated circuit (ASIC), a programmable gate array (PGA), a field PGA (FPGA), a digital signal processor (DSP), or any other digital or analog circuitry configured to interpret, execute program instructions, process data, or any combination thereof. Processor 202 may logically include a hardware or software module (e.g., software module A 216A and/or software module N 216N stored in storage device 214), which may be configured to control processor 202 as well as a special-purpose processor where software instructions are incorporated into processor 202.

Processor 202 may be designed for and/or include additional capabilities designed for use with machine learning, deep learning, and/or artificial intelligence applications. Accordingly, additional non-limiting examples of processor 202 include a graphics processing unit (GPU), a GPU with a compute unified device architecture (CUDA), a data processing unit (DPU), a tensor processing unit (TPU), a tensor streaming processor (TSP), a neural engine, and a processor with an embedded/integrated neural engine core(s).

Processor 202 may execute one or more instruction(s) for processing one or more measurement(s) according to any one or more algorithm(s), function(s), or calculation(s) discussed below. It may be appreciated that the disclosure may operate on information handling system 200 with more than one processor 202 or on a group of information handling systems 200 networked together to provide greater processing capability. The logical operations performed by processor 202 may implemented as (i) a sequence of computer implemented steps, operations, or procedures running on a programmable circuit within a general use computer, (ii) a sequence of computer implemented steps, operations, or procedures running on a specific-use programmable circuit, and/or (iii) interconnected machine modules or program engines within the programmable circuits.

Information handling system 200 may execute some, or all, of the recited methods, may be a part of the recited systems, and/or may operate according to instructions in the recited tangible computer-readable storage devices. Such logical operations may be implemented as modules configured to control processor 202 to perform particular functions according to the programming of software modules 216A and 216N.

Cache 212 may be one or more hardware device(s) capable of storing digital information (e.g., data) in a non-transitory medium. Cache 212 may be considered "high-speed", having comparatively faster read/write access than memory 206 and storage device 214, and therefore utilized by processor 202 to process data more quickly than data stored in memory 206 or storage device 214. Accordingly, information handling system 200, via processor 202, may copy data from memory 206 and/or storage device 214 to cache 212 for comparatively speedier access and processing. Processor 202 may be operatively connected to (or include) cache 212. Cache 212 expressly excludes media such as transitory waves, energy, carrier signals, electromagnetic waves, and signals per se.

Memory 206 may be one or more hardware device(s) capable of storing digital information (e.g., data) in a non-transitory medium. In any embodiment, when accessing memory 206, software may be capable of reading and writing data at the smallest units of data normally accessible (e.g., "bytes"). Specifically, memory 206 may include a unique physical address for each byte stored thereon, thereby enabling software to access and manipulate data stored in memory 206 by directing commands to specific physical addresses that are associated with a byte of data (i.e., "random access"). Non-limiting examples of memory 206 devices include flash memory, random access memory (RAM), dynamic RAM (DRAM), static RAM (SRAM), resistive RAM (ReRAM), read-only memory (ROM), and electrically erasable programmable ROM (EEPROM). In any embodiment, memory 206 devices may be volatile or non-volatile. Memory 206 expressly excludes media such as transitory waves, energy, carrier signals, electromagnetic waves, and signals per se.

Storage device 214 may be one or more hardware device(s) capable of storing digital information (e.g., data) in a non-transitory medium. Non-limiting examples of storage device 214 include (i) integrated circuit storage devices (e.g., a solid-state drive (SSD), Non-Volatile Memory Express (NVMe), flash memory, etc.), (ii) magnetic storage devices (e.g., a hard disk drive (HDD), floppy disk, tape, diskette, cassettes, etc.), (iii) optical media (e.g., a compact disc (CD), digital versatile disc (DVD), etc.), and (iv) printed media (e.g., barcode, quick response (QR) code, punch card, etc.). In any embodiment, prior to reading and/or manipulating data located in storage device 214, data may first be copied in "blocks" (instead of "bytes") to other, intermediary storage mediums (e.g., memory 206, cache 212) where the data can then be accessed in "bytes". Storage device 214 expressly excludes media such as transitory waves, energy, carrier signals, electromagnetic waves, and signals per se.

As used herein, a non-transitory computer readable medium means any (i) storage device 214, (ii) memory 206, (iii) cache 212, and/or (iv) any other hardware device capable of non-transitorily storing and/or carrying data. When data that includes computer-executable instructions are provided to information handling system 200 via communication interface 226, information handling system 200 writes that data to memory 206, storage device 214, or cache 212. Thus, the data received via communication interface 226 may be stored in a non-transitory computer-readable medium. Combinations of the above should also be included within the scope of the computer-readable media.

A software module (e.g., module A 216A, module N 216N) may be data that includes computer-executable instructions (e.g., code, algorithms, software, program). Computer-executable instructions include, for example, instructions and data which cause information handling system 200, and/or processor 202 thereof, to perform a certain function or series of functions. Computer-executable instructions also include program modules that are executed in standalone or network environments. Generally, program modules include routines, programs, components, data structures, objects, and the functions inherent in the design of special-purpose processors. These program modules may be utilized to perform particular tasks or implement particular abstract data types. Computer-executable instructions, associated data structures, and program modules represent examples of code for executing steps of the methods disclosed herein.

Input device 222 may be one or more hardware device(s) that generate and/or input data into information handling system 200 via one or more sensor(s) or reading device(s). Non-limiting examples of input device 222 include a mouse, a keyboard, a monitor, a camera, a microphone, touchpad, touchscreen, fingerprint reader, joystick, gamepad, and/or drive for reading non-transitory computer readable media (e.g., a compact disc (CD) drive, a floppy disk drive, tape drive, etc.). To enable user interaction with information handling system 200, input device 222 represents any number of input mechanisms, such as a microphone for speech, a touch-sensitive screen for gesture or graphical input, and so forth.

Output device 224 may be one or more hardware device(s) that export data from information handling system 200 via peripheral device(s). Non-limiting examples of an output device 224 include a visual display monitor, speakers, printer, LED bulb (e.g., a status light), haptic feedback device, and/or drive for writing to non-transitory computer readable media (e.g., a CD drive, a floppy disk drive, tape drive, etc.).

Communication interface 226 may be one or more hardware device(s) that provide the capability to send and/or receive data with one or more other information handling systems 200 via a network. Communication interface 226 may communicate via any suitable form of wired interface (e.g., Ethernet, fiber optic, serial communication etc.) and/or wireless interface (e.g., Wi-Fi® (Institute of Electrical and Electronics Engineers (IEEE) 802.11), Bluetooth® (IEEE 802.15.1), etc.) and utilize one or more protocol(s) for the transmission and receipt of data (e.g., transmission control protocol (TCP), internet protocol (IP), remote direct memory access (RDMA), etc.). Non-limiting examples of communication interface 226 include a network interface card (NIC), a modem, an Ethernet card/adapter, and a Wi-Fi® card/adapter.

System bus 204 may be a system of hardware connections (e.g., sockets, ports, wiring, conductive tracings on a printed circuit board (PCB), etc.) used for sending (and receiving) data to (and from) each of the devices connected thereto. System bus 204 allows for communication via an interface and protocol (e.g., inter-integrated circuit (I2C), peripheral component interconnect (express) (PCI(e)) fabric, etc.) that may be commonly recognized by the devices utilizing system bus 204. System bus 204 may be any of several types of bus structures including a memory bus or memory controller, a peripheral bus, and a local bus using any of a variety of bus architectures. As a non-limiting example, a basic input/output (BIOS) stored in ROM, may provide the basic routine that helps to transfer information between elements using system bus 204, within information handling system 200 (e.g., during initialization). Each of the previously discussed components of information handling system 200 may be operatively connected to system bus 204, in turn allowing each of those components to communicate through system bus 204.

FIG. 2B

Figure 2B:
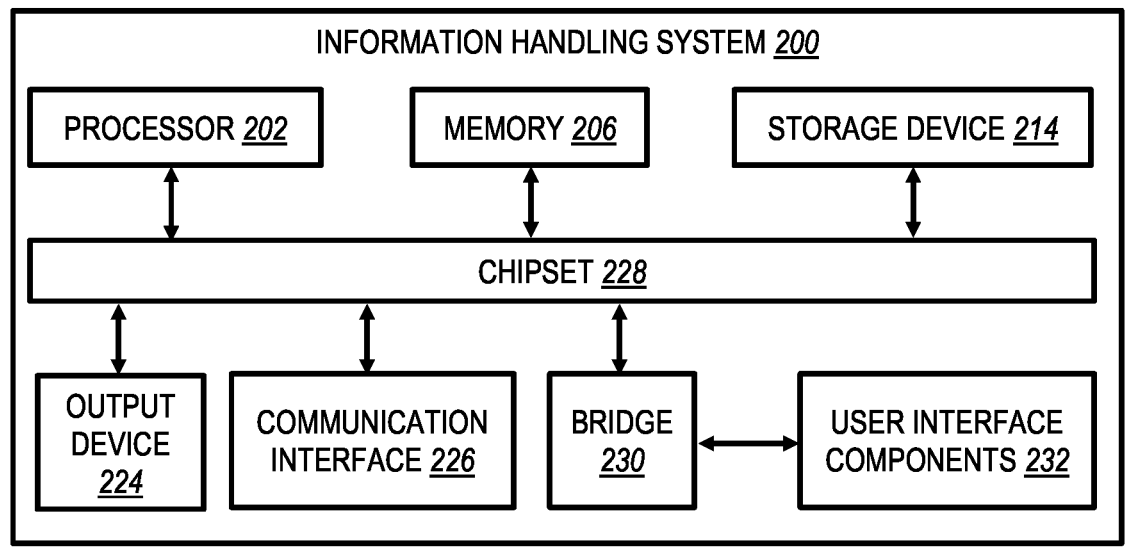
FIG. 2B is a diagram of another example information handling system.

FIG. 2B is a diagram of another example information handling system having a chipset architecture that may be used in executing a method for generating and displaying a graphical user interface (GUI). Information handling system 200 is an example of computer hardware, software, and firmware that may be used to implement the disclosed technology. Information handling system 200 may include a processor 202, representative of any number of physically and/or logically distinct resources capable of executing software, firmware, and hardware configured to perform identified computations.

Chipset 228 may be one or more hardware device(s) that controls the flow of data to and from processor 202. As a non-limiting example, chipset 228 may obtain data from processor 202 (and/or cache 212 thereof) and output that data to output device 224 (e.g., a visual display monitor). Further, chipset 228 may interface with one or more communication interface(s) 226, with differing physical interfaces, to enable communication with those interfaces. As another non-limiting example, chipset 228 may receive raw data via communication interface 226, write the raw data to memory 206, send that data to processor 202 for processing, retrieve the processed data from processor 202, and then write the processed data to memory 206 and/or storage device 214.

Bridge 230 may be one or more hardware device(s) that act as an interface between chipset 228 and one or more user interface component(s) 232. Non-limiting examples of user interface components 232 may include any input device 222 or output device 224 described in FIG. 2A. In general, inputs to information handling system 200 may come from any of a variety of sources—machine and/or human generated.

Some applications of the methods for generating, displaying, and using the GUI disclosed herein may include receiving ordered datasets over the physical interface. Such ordered datasets may be generated by information handling system 200 itself (e.g., by processor 202 analyzing data stored in memory 206 or storage device 214). Further, information handling system 200 may receive inputs from a user via user interface components 232 and executes corresponding functions, such as browsing functions by interpreting these inputs using processor 202.

FIG. 3

Figure 3:
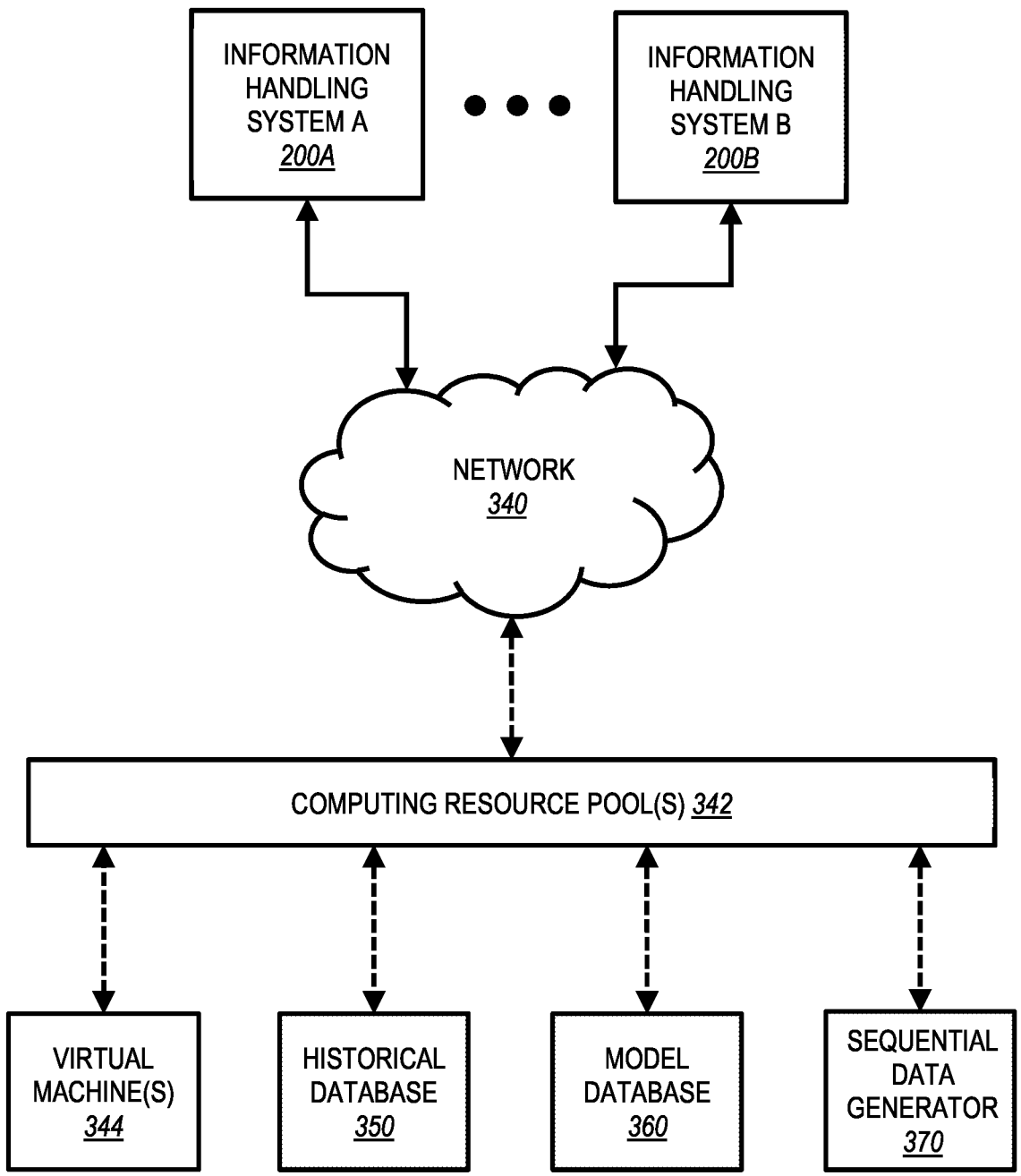
FIG. 3 is a diagram of an example system with multiple information handling systems, connected via a network, and used to form computing resource pools.

FIG. 3 is a diagram of an example system with multiple information handling systems, connected via a network, and used to form computing resource pools. While a specific configuration may be shown, other configurations may be used without departing from the disclosed embodiment. Accordingly, embodiments disclosed herein should not be limited to the configuration of devices and/or components shown.

In any embodiment, a system may include one or more information handling system(s) (e.g., information handling system A 200A, information handling system B 200B), network 340, computing resource pool(s) 342, virtual machine(s) 344, historical database 350, model database 360, and sequential data generator 370. Each of these components is described below.

Network 340 may be a collection of connected network devices (not shown) that allow for the communication of data from one network device to other network devices, or the sharing of resources among network devices. Non-limiting examples of network 340 include a local area network (LAN), a wide area network (WAN) (e.g., the Internet), a mobile network, any combination thereof, or any other type of network that allows for the communication of data and sharing of resources among network devices and/or information handling systems 200 operatively connected to network 340. One of ordinary skill in the art, having the benefit of this detailed description, would appreciate that a network may be a collection of operatively connected computing devices that enables communication between those computing devices.

Computing resource pool(s) 342 are organized clusters of virtualized resources of the components, or subcomponents, of one or more information handling systems 200. Non-limiting examples of a computing resource include processor(s) 202, a processor thread, any range of memory 206, any blocks on storage device(s) 214, input device(s) 222, output device(s) 224, communication interface(s) 226, and any peripheral device components of sub-components thereof (e.g., a graphics processing unit (GPU), data processing unit (DPU), NIC, etc.). An orchestrator (not shown) may track, monitor, aggregate, computing resources together and present those resources as a "pool" of computing resources (i.e., computing resources pool(s) 342) based on a shared property. As a non-limiting example, memory 206 disposed across six information handling systems 200 may be "pooled" together and presented as a single "memory pool" (in computing resource pool(s) 342). Similarly, as another non-limiting example, GPUs installed in three independent information handling systems 200 may be "pooled" into a single "GPU pool" (in computing resource pool(s) 342). As a third non-limiting example, storage device(s) 214 disposed within a single information handling system 200 may be presented as a "storage pool" (in computing resource pool(s) 342). In turn, the orchestrator may assign (e.g., allocate) portions of one or more computing resources pool(s) 342 to software (e.g., virtual machine(s) 344, sequential data generator 370) and virtual storage volume(s) (e.g., network attached storage (NAS), historical database 350, model database 360).

As used herein, "software" means any set of computer instructions, code, and/or algorithms that are used by information handling system 200 to perform one or more specific task(s), function(s), or process(es). Information handling system 200 may execute software by reading data from memory 206 and/or storage device(s) 214, processing that data via processor 202, and writing processed data to memory 206 and/or storage device(s) 214. Multiple software instances may execute on a single information handling system 200 simultaneously. Further, in any embodiment, a single software instance may utilize resources from two or more information handling systems 200 simultaneously (e.g., via computing resource pool(s) 342) and may move between information handling systems 200, as instructed (e.g., by an orchestrator).

A virtual storage volume (e.g., historical database 350, model database 360) may be a virtual space where data may be stored. A virtual storage volume may use any suitable means of underlying storage device(s) 214 and/or memory 206 for storing data (e.g., a storage pool and/or memory pool available in computing resource pool(s) 342). A virtual storage volume may be managed by a virtual machine 344 that handles the access (reads/writes), filesystem, redundancy, and addressability of the data stored therein.

Virtual machine 344 may be software, executing on one or more information handling system(s) 200, that provides a virtual environment in which other software (e.g., a program, a process, an application, etc.) may execute. In any embodiment, virtual machine 344 may be created by a virtual machine manager (e.g., a "hypervisor") that allocates some portion of computing resources (e.g., in one or more computing resource pool(s) 342) for virtual machine 344 to execute. The computing resources allocated to virtual machine 344 may be aggregated from one or more information handling system(s) 200 and presented as unified "virtual" resources within virtual machine 344 (e.g., virtual processor(s), virtual memory, virtual storage, virtual peripheral device(s), etc.). As computing resource pool(s) 342 are used to generate virtual machine 344, the underlying hardware storing, executing, and processing the operations (of virtual machine 344) may disposed in any number of information handling system(s) 200.

In any embodiment, virtual machine 344 may be created specifically for using one or more computing resource pool(s) 342 related to machine learning, deep learning, and/or artificial intelligence (e.g., from one or more processor(s) 202). Such virtual machine 344 may allow for the "offline" private training of one or more data model(s) (e.g., in model database 360) without exposing data in historical database 350 to any third party.

Historical database 350 may be a data structure (i.e., a collection of data) that includes information about previous drilling projects. Historical database 350 may take the form of a virtual storage volume (e.g., using a "storage pool" of the computing resource pool(s) 342) and/or historical database 350 may be data stored locally on a single information handling system 200 (e.g., as files in a directory). Additional details regarding historical database 350 may be found in the description of FIG. 4A.

Model database 360 may be a data structure (i.e., a collection of data) that includes information about previous drilling projects. Model database 360 may take the form of a virtual storage volume (e.g., using a "storage pool" of the computing resource pool(s) 342) and/or model database 360 may be data stored locally on a single information handling system 200 (e.g., as files in a directory). Additional details regarding model database 360 may be found in the description of FIG. 4B.

Sequential data generator 370 may be software, executing on one or more information handling system(s) 200 and/or in one or more virtual machine(s) 344, that processes input data to generate output data, using one or more data models. Additional details regarding sequential data generator 370 may be found in the description of FIG. 4C.

FIG. 4A

Figure 4A:
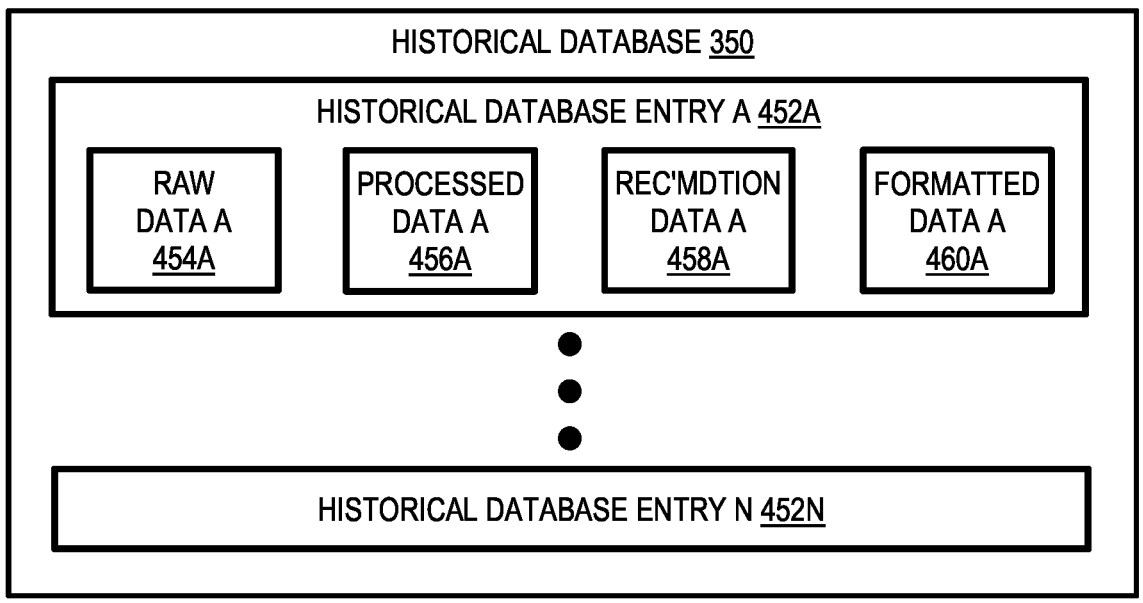
FIG. 4A is a diagram of a historical database.

FIG. 4A is a diagram of a historical database. While a specific configuration may be shown, other configurations may be used without departing from the disclosed embodiment. Accordingly, embodiments disclosed herein should not be limited to the configuration of devices and/or components shown.

Historical database 350 may be a data structure that includes one or more historical database entries (e.g., historical database entry A 452A, historical database entry N 452N). Historical database entry 452 may be a data structure that includes any combination of (i) a historical database entry identifier (not shown), (ii) raw data 454, (iii) processed data 456, (iv) recommendation data 458, and (v) formatted data 460. Each of these is explained below.

A historical database entry identifier (not shown) may be an identifier that uniquely identifies a single historical database entry 452. Non-limiting examples of an identifier include a tag, an alphanumeric entry, a filename, and a row number in table.

Raw data 454 (e.g., raw data A 454A) may be data, which may be mostly (or completely) in an unprocessed form. Raw data 454 may be data, as collected, from one or more sensors or probes at a drilling environment (or a potential drilling environment). Raw data 454 may be kept from previous and existing drilling environments. Non-limiting examples of raw data 454 include unprocessed formation data (e.g., gamma detection, resistivity, temperature, neutron density, neutron porosity, electromagnetic detection, etc.) and geophysical data (e.g., subsurface geology, seismic surveys, reservoir properties, lithology data, density, etc.). Such raw data 454 may be retrieved from sensors, probes, and logging equipment and stored on one or more storage device(s) 214 (e.g., in historical database 350).

Processed data 456 (e.g., processed data A 456A) may be data derived from processing raw data 454. As raw data 454 may not be in a form readily usable for analysis, raw data 454 may be processed using one or more techniques (e.g., filtering, smoothing, scaling, normalizing, converting, cropping, etc.) to obtain processed data 456. Processed data 456 may be in a form where a person of ordinary skill in the art (e.g., a geophysicist, an engineer, an operator, etc.) may be able to analyze processed data 456 to generate recommendations on how to proceed with the operations at the drilling environment.

Recommendation data 458 (e.g., recommendation data A 458A) may be data related to the operations performed, equipment used, and properties of the well at a drilling site. In any embodiment, processed data 456 may be analyzed to generate recommendations and proposals for actions to be performed at a drilling environment. Recommendation data 458 may be one or more potential options for proceeding in view of processed data 456. Further, some actions were ultimately performed at the drilling environment (potentially based, in part, on the recommendations derived from processed data 456). Those actions are also included in recommendation data 458, in addition to relevant properties of the resources used to perform those actions. Non-limiting examples of recommendation data 458 include proposed drilling location(s), drilling path, mud properties, casing design, mud targets, well design, well depth, tools needed, sourcing of materials (e.g., proximity to vendors), updated formation data, and/or any other data relevant data for the proposed design and operation of a well.

Formatted data 460 (e.g., formatted data A 460A) may be data that presents processed data 456 and recommendation data 458 in a specified format. The proposals, in formatted data 460, may be generated by a person of ordinary skill in the art, and include one or more options for proposed actions (e.g., recommendation data 458) to be performed at the drilling environment based on processed data 456. Formatted data 460 may be generated in a particular document format meant to be readable by a human (e.g., with a title, table of contents, headings) and may include visualizations of processed data 456 (e.g., charts, graphs, etc.). Non-limiting examples of formatted data 460 include a formal technical report, a design of service (DoS) document, and a whitepaper.

A single historical database entry 452 may be exclusively associated with an individual drilling project (or part of a drilling project) via the historical database entry identifier. In any embodiment, as a non-limiting example, as shown in FIG. 4A, raw data A 454A, processed data A 456A, recommendation data A 458A, and formatted data A 460A may all relate to the same drilling environment (e.g., as shown in FIG. 1), independent of other drilling environments.

In any embodiment, some data may be shared across multiple historical database entries 452. As another non-limiting example, raw data A 454A may also be the same raw data 454 present in historical database entry R (not shown) as both may share the same drilling environment. Yet, processed data 456, recommendation data 458, and formatted data 460 may differ for both historical database entries 452 as the data was processed differently for different purposes to produce different recommendations.

FIG. 4B

Figure 4B:
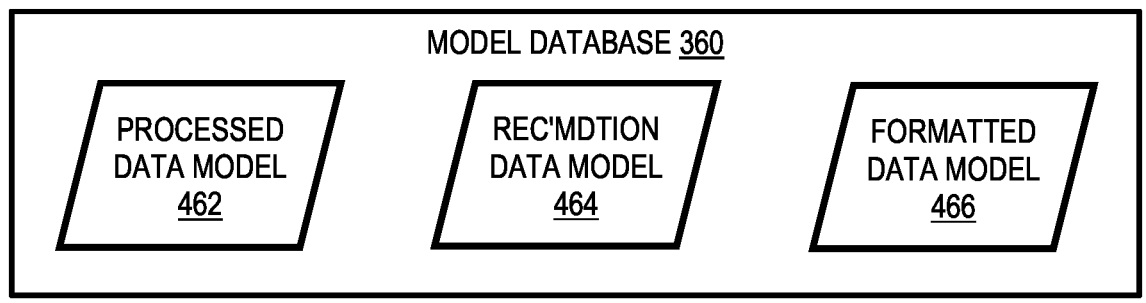
FIG. 4B is a diagram of a model database.

FIG. 4B is a diagram of a model database. While a specific configuration may be shown, other configurations may be used without departing from the disclosed embodiment. Accordingly, embodiments disclosed herein should not be limited to the configuration of devices and/or components shown.

Model database 360 may be a data structure that includes one or more data model(s) (e.g., processed data model 462, recommendation data model 464, formatted data model 466). Generally, in any embodiment, a data model may be data that includes the algorithm, weights, parameters, properties, attributes, and/or other metadata used to configure a data generator to create data (e.g., generate output data using input data). A data model may be trained and tuned using one or more machine learning techniques that optimize the output data (of a data generator using the data model) to have similar properties to existing data of the same type.

Processed data model 462 may be a data model (used to configure processed data generator 472) to create generated processed data 776 using raw data 454. Processed data model 462 may be trained on preexisting raw data 454 and processed data 456 (e.g., from historical database 350) using one or more machine learning techniques and optimized to produce generated processed data 776 similar to historical processed data 456 in the processing actions performed (e.g., filtering, smoothing, normalizing, etc.). Additional details regarding the training of processed data model 462 may be found in the description of FIG. 5B and FIG. 6.

Recommendation data model 464 may be a data model (used to configure recommendation data generator 474) to create generated recommendation data 778 using processed data 456 (or generated processed data 776). Recommendation data model 464 may be trained on preexisting processed data 456 and recommendation data 458 (e.g., from historical database 350) using one or more machine learning techniques and optimized to produce generated recommendation data 778 similar to historical recommendation data 458 in the action's performed at the drilling environment (e.g., drilling location, drilling path, mud properties, etc.). Additional details regarding the training of recommendation data model 464 may be found in the description of FIG. 5B and FIG. 6.

Formatted data model 466 may be a data model (used to configure formatted data generator 476) to create generated formatted data 780 using recommendation data 458 (or generated recommendation data 778). Formatted data model 466 may be trained on preexisting recommendation data 458 and formatted data 460 (e.g., from historical database 350) using one or more machine learning techniques and optimized to produce generated formatted data 780 that has similar, style, layout, presentation, and thoroughness to historical formatted data 460. Additional details regarding the training of formatted data model 466 may be found in the description of FIG. 5B and FIG. 6.

FIG. 4C

Figure 4C:
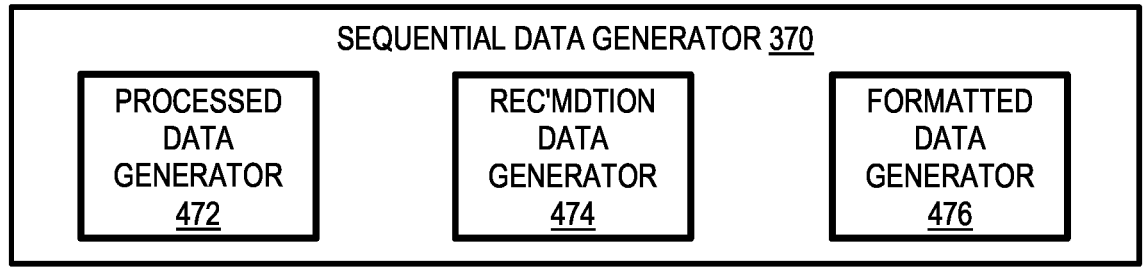
FIG. 4C is a diagram of a sequential data generator.

FIG. 4C is a diagram of a sequential data generator. While a specific configuration may be shown, other configurations may be used without departing from the disclosed embodiment. Accordingly, embodiments disclosed herein should not be limited to the configuration of devices and/or components shown.

Generally, in any embodiment, a data generator may be software that processes "input data" to generate "output data" using a data model. In any embodiment, a data generator may be a user accessible front end that allows for usage of the data model (outside the training environment). Non-limiting examples of a data generator include a command-line interface (CLI), an application programming interface (API), a graphical user interface (GUI), and/or any other means of interaction to initiate the processing of input data to generate output data. In any embodiment, a data generator may require input data to begin generating output data. Input data may be provided directly to the data generator or specified via a path to the input data.

Sequential data generator 370 may be software that includes one or more data generator(s) as subprocesses (e.g., processed data generator 472, recommendation data generator 474, formatted data generator 476). Further, sequential data generator 370 may be configured to automatically pass the output data of one data generator to the input of another data generator.

Processed data generator 472 may be a data generator that accepts raw data 454 (as input data) and creates generated processed data 776 (as output data). Processed data generator 472 uses processed data model 462 to specify the parameters of the operations to perform on raw data 454 to create generated processed data 776.

Recommendation data generator 474 may be software that accepts processed data 456 (or generated processed data 776) (as input data) and creates generated recommendation data 778 (as output data). Recommendation data generator 474 uses recommendation data model 464 to specify the parameters of the operations to perform on processed data 456 (or generated processed data 776) to create generated recommendation data 778.

Formatted data generator 476 may be software that accepts recommendation data 458 (or generated recommendation data 778) (as input data) and creates generated formatted data 780 (as output data). Formatted data generator 476 uses formatted data model 466 to specify the parameters of the operations to perform on recommendation data 458 (or generated recommendation data 778) to create generated formatted data 780.

In any embodiment, sequential data generator 370 may use (i.e., perform the operations of) each data generator therein in a sequential order (e.g., in the order listed previously), where the "output" data from one data generator may be provided as the "input" data to the subsequent data generator. In any embodiment, any individual data generator may be provided "input" data, in isolation, used to generate "output" data, without the use of any of the other data generators. In any embodiment, sequential data generator 370 may be configured to use any combination of data generators and one or more data generators may be used more than once.

FIG. 5A

Figure 5A:
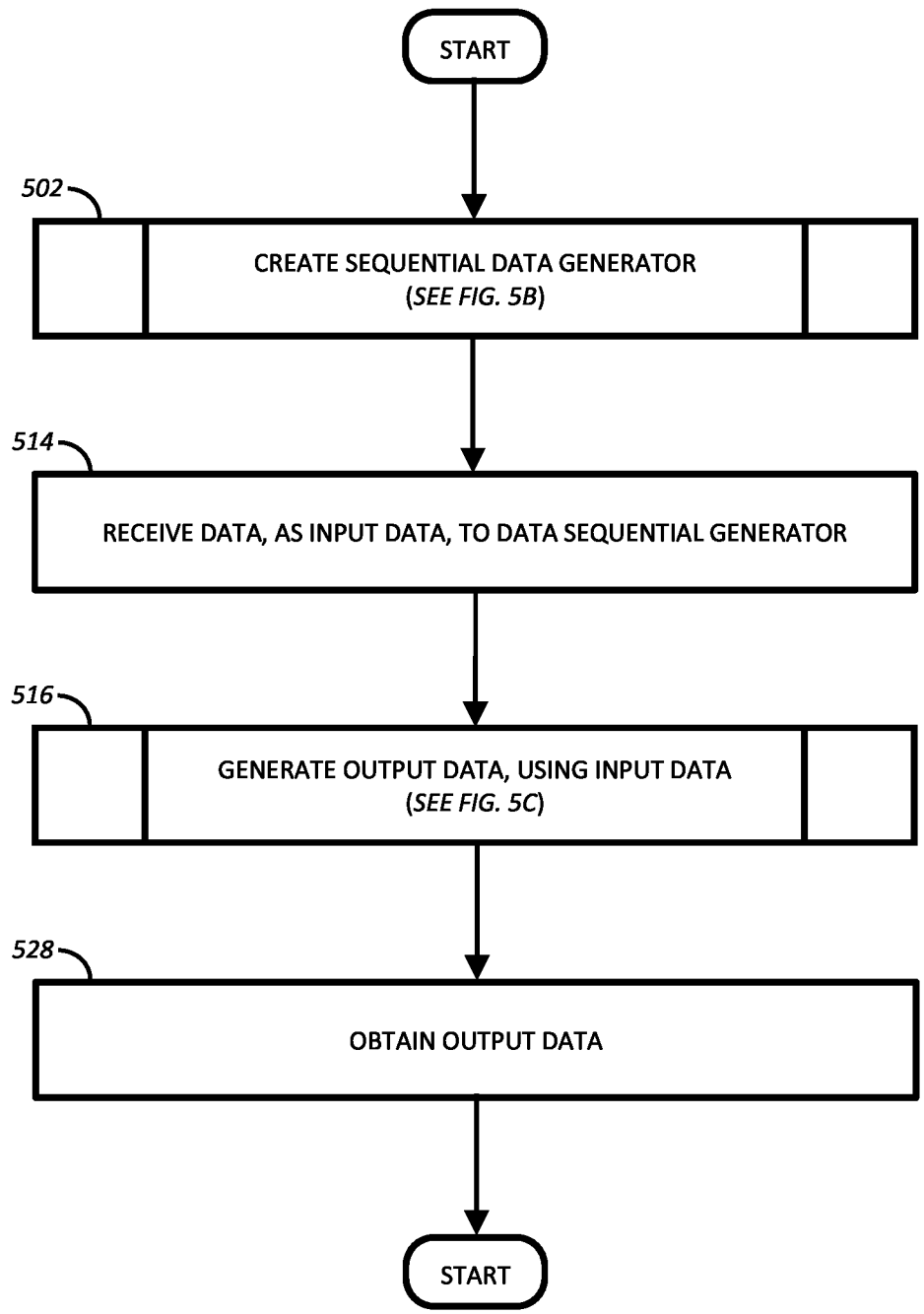
FIG. 5A is a flowchart of a method for creating and using a sequential data generator to obtain output data.

FIG. 5A is a flowchart of a method for creating and using a sequential data generator to obtain output data. All or a portion of the method shown may be performed by one or more components of information handling system 200 (see description in FIGS. 2A and 2B) or a user thereof. While the various steps in this flowchart are presented and described sequentially, one of ordinary skill in the relevant art (having the benefit of this detailed description) would appreciate that some or all steps may be executed in different orders, combined, or omitted, and some or all steps may be executed in parallel.

In block 502, sequential data generator 370 may be created. Information handling system 200 may generate sequential data generator 370 by using data available in historical database 350 to train one or more data models, for use by one or more data generators. Additional details regarding this block may be found in the description of FIG. 5B.

In block 514, raw data 454 may be received and provided to sequential data generator 370 as "input" data. Sequential data generator 370 then beings to process raw data 454, internally, by passing raw data 454 to processed data generator 472.

In block 516, sequential data generator 370 may generate "output" data (e.g., generated formatted data 780 (see description in FIG. 7)). Additional details regarding this block may be found in the description of FIG. 5C.

In block 528, the output data (e.g., generated formatted data 780) may be obtained, by a user and/or a component of information handling system 200. The output data may be stored on a storage device 214, memory 206, on a virtual storage volume, physically printed, transmitted (e.g., emailed, shared on a virtual storage volume), and/or accessed by any means suitable to a user.

FIG. 5B

Figure 5B:
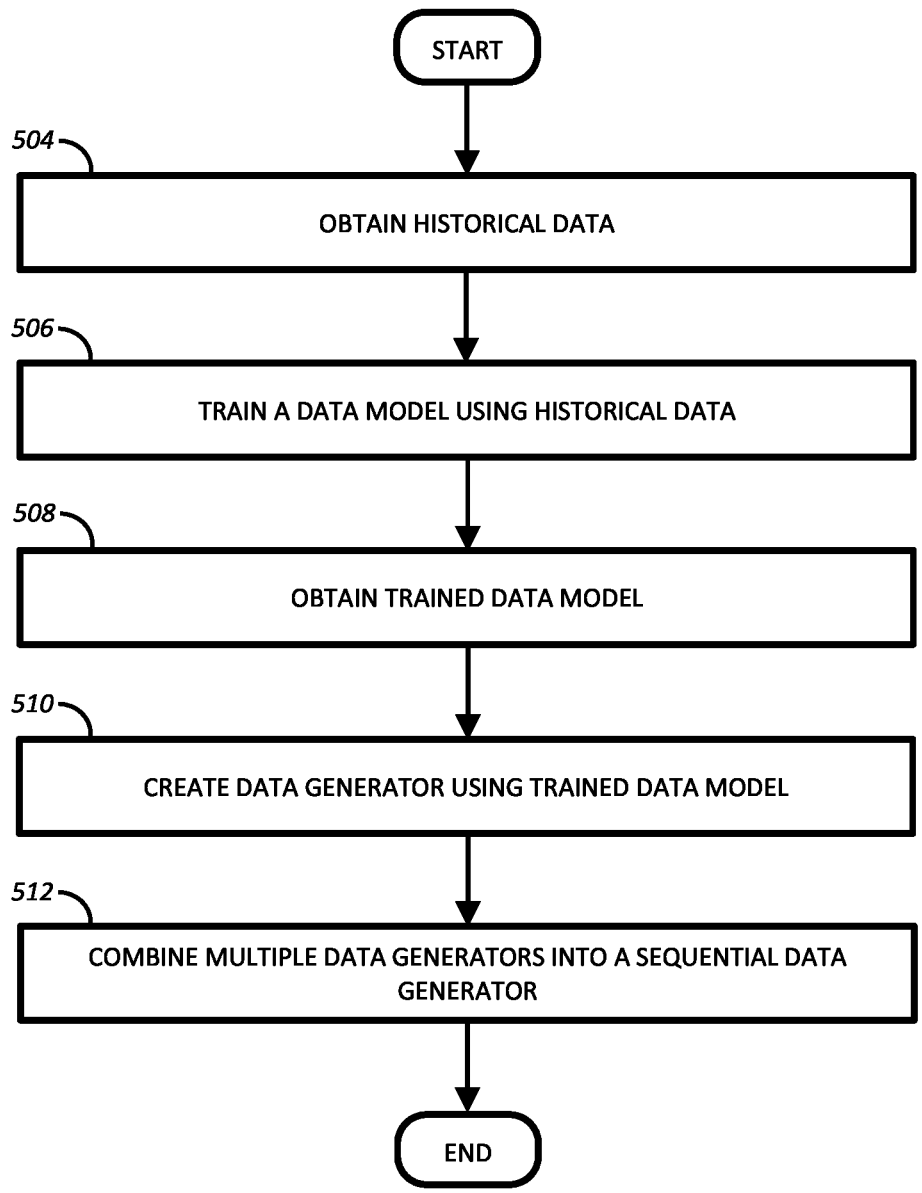
FIG. 5B is a flowchart of a method for creating a sequential data generator.

FIG. 5B is a flowchart of a method for creating a sequential data generator. All or a portion of the method shown may be performed by one or more components of information handling system 200 (see description in FIGS. 2A and 2B) or a user thereof. While the various steps in this flowchart are presented and described sequentially, one of ordinary skill in the relevant art (having the benefit of this detailed description) would appreciate that some or all steps may be executed in different orders, combined, or omitted, and some or all steps may be executed in parallel.

In block 504, historical data may be obtained. Historical data may be obtained from historical database 350. In any embodiment, historical data may include any existing data useful for training a data model. As a non-limiting example, for training processed data model 462, raw data 454 and processed data 456 may be utilized at the most relevant data.

In block 506, the data model may be "trained" using the historical data. In any embodiment, training the data model may utilize one or more machine learning techniques to "tune" the parameters of the data model to generate output data that satisfies a desired level of sufficiency.

As a non-limiting example, one technique to train a data model includes categorizing (i.e., labeling) the historical data as either "historical input data" or "historical output data". In instances where the historical data contains sufficient structure, a data model may be initially constructed to perform functions (e.g., processes) on the input data that are likely to generate the output data. The parameters of the functions may be assigned manually or randomly and may be constrained or unconstrained. Similarly, if two or more functions are present, the ordering of the function may be constrained or unconstrained.

Continuing with the example, the data model may then be provided with historical input data and tasked to generate artificial output data using one or more functions. Then, a "difference" may be calculated between the generated output data and the historical output data (e.g., least square, simple subtraction, visual similarity, etc.). In turn, the data model may be tuned by adjusting the parameters of the internal functions to minimize the calculated difference between the generated output data and historical output data. Accordingly, depending on the number, configurability, and usefulness of the functions, the data model may be optimized to generate data that may be sufficiently accurate and useful to a user of the system.

In any embodiment, one or more types of machine learning algorithm(s) and/or training methods may be utilized. As a non-limiting example, a neural network may be utilized (instead of, or in addition to supplied functions). Such a neural network, constructed of logical nodes and weights to initialize activation functions, may take any suitable form to sufficiently train the data model to achieve the desired generated output data.

In any embodiment, training the data model may be a repetitious (e.g., iterative) process that may be repeated until one or more optimization criteria are satisfied (e.g., calculated difference falls below a threshold, subjective determination based on user review). Training of a data model may be a continuous process where the data model is trained regularly (even during use) so that the data model provides generated output data using newer additions to historical database 350.

In block 508, the data model may be obtained. In any embodiment, the data model may be obtained when the data model may be trained sufficiently enough to satisfy one or more optimization criteria (e.g., calculated difference falls below a threshold, subjective determination based on user review).

In block 510, a data generator may be created using the trained data model. The data generator may be created by initializing an interface which provides the ability to utilize the associated data model (e.g., provide input data, have it processed using the data model, receive output data). In any embodiment, multiple data generators may be created using the same data model. That is, as a non-limiting example, two or more data generators may be initialized (on different information handling systems 200) both using the same (trained) data model to generate output data.

In block 512, sequential data generator 370 may be created by combining two or more data generators into a unified application. As a non-limiting example, if multiple data generators are created (e.g., via the method provided in blocks 504-510), and the "output data" of a first data generator satisfies the conditions of "input data" of a second generator, those two generators may be sequentially linked in sequential data generator 370 so that data may be automatically provided to the subsequent data generator for processing. In any embodiment, similar to each individual data generator, an interface may be created which provides the ability to use sequential data generator 370.

FIG. 5C

Figure 5C:
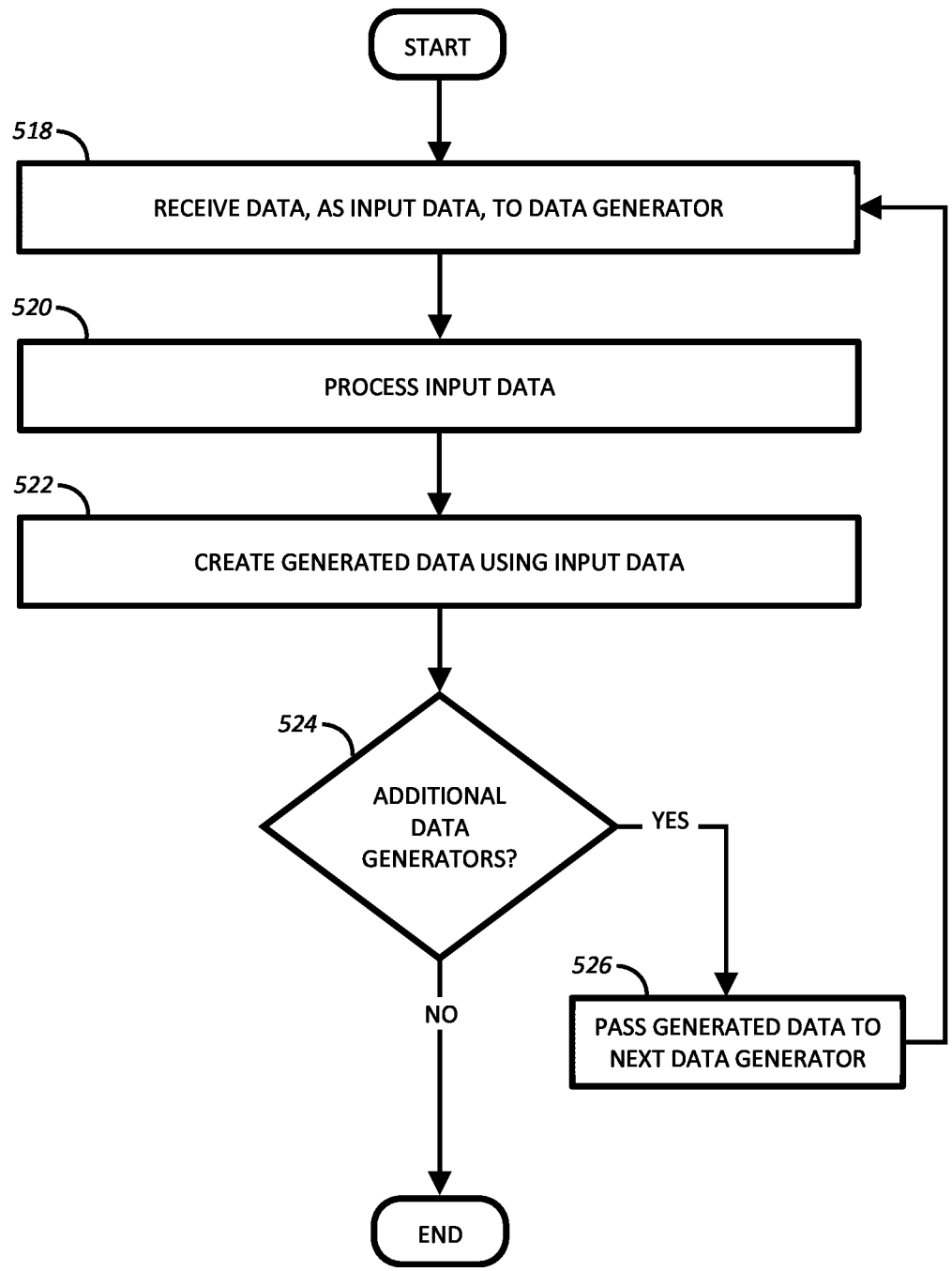
FIG. 5C is a flowchart of a method for using a sequential data generator to generate output data.

FIG. 5C is a flowchart of a method for using a sequential data generator to generate output data. All or a portion of the method shown may be performed by one or more components of information handling system 200 (see description in FIGS. 2A and 2B) or a user thereof. While the various steps in this flowchart are presented and described sequentially, one of ordinary skill in the relevant art (having the benefit of this detailed description) would appreciate that some or all steps may be executed in different orders, combined, or omitted, and some or all steps may be executed in parallel.

In block 518, data may be received as input data to a data generator. Input data may be provided directly to the data generator, or a path to the input data may be provided (where the data generator retrieves the specified data). The data generator may be one of any data generators in sequential data generator 370, depending on the type of input data and the sequence of the data generators to be used.

In block 520, the data generator uses an associated data model to process the input data. The data model—used by the data generator—may be associated (e.g., via a matching identifier) or the data generator may be created to use a specific data model (e.g., hardcoded into the data generator). The data generator processes the input data by generating new output data as instructed by the data model. That is, in any embodiment, the data model provides a set of instructions (e.g., operations) to perform, based on the input data, to create the output data.

In block 522, the data generator creates (and stores) the generated output data. The generated output data may be fully created when the data generator finishes processing the input data through the associated data model. In any embodiment, the output data may be stored in any suitable location (e.g., storage device(s) 214, memory 206, any combination thereof using a virtual storage volume, etc.).

In block 524, a determination may be made if there are additional data generators to be used to process the output data. In any embodiment, sequential data generator 370 may be configured to process data using two or more data generators. In such an instance, if the data generator most recently used (in block 522) is not the last data generator in the sequence, the output data is passed to the next data generator (i.e., as input data). However, if the data generator most recently used (in block 522) is the last data generator in the sequence, the output data may not be processed any further by sequential data generator 370.

If the determination is made that there are additional data generators (block 524—YES), the method proceeds to block 526. Otherwise, if the determination is made that there are no additional data generators (block 524—NO), the method may end.

In block 526, the output data may be passed to the next data generator (i.e., as input data). The data may be provided directly to the data generator, or the storage location of the data may be provided to the data generator. After block 526, the method returns to block 518.

FIG. 6

Figure 6:
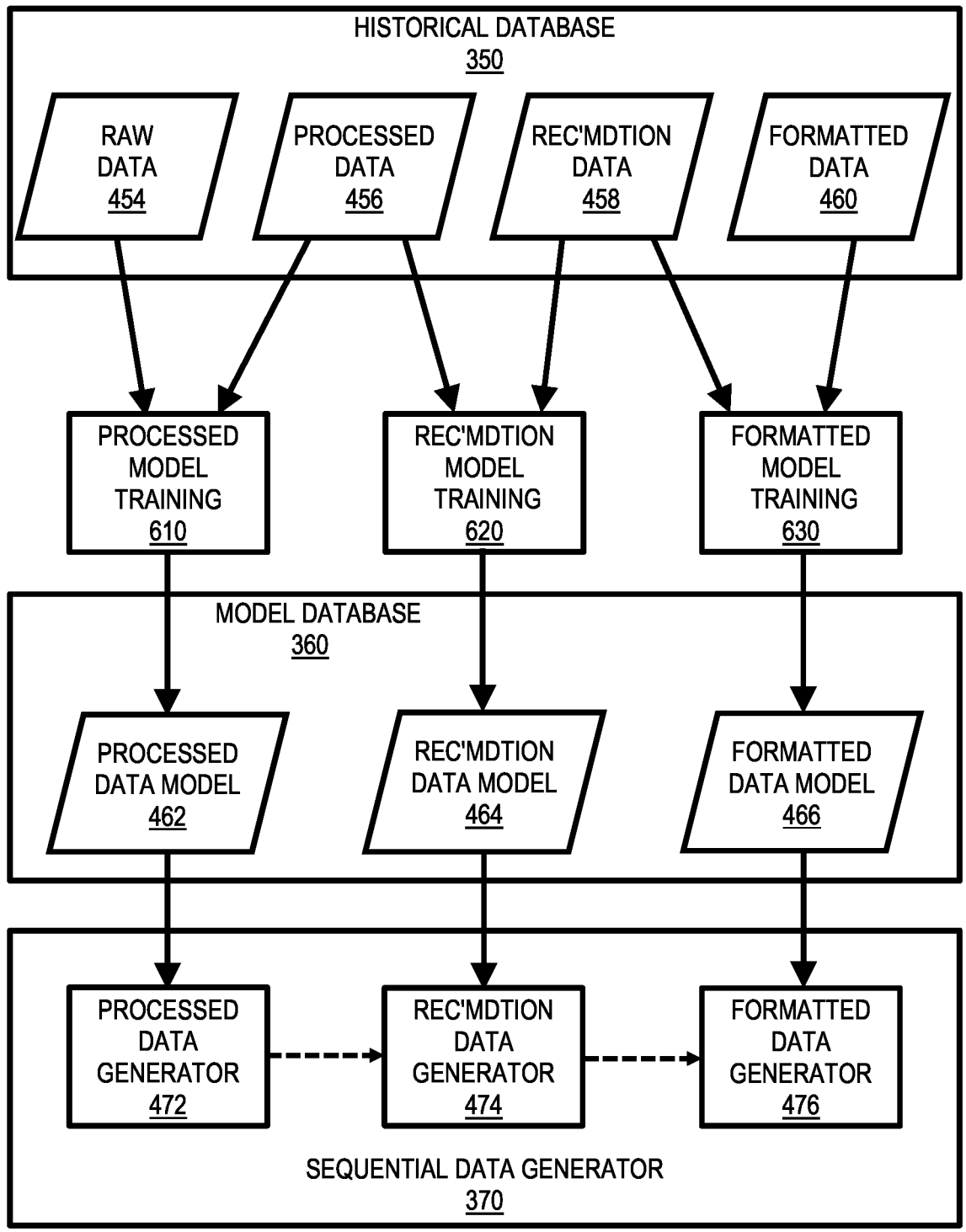
FIG. 6 is a diagram of an example of a system and method for creating a sequential data generator.

FIG. 6 is a diagram of an example of a system and method for creating a sequential data generator. The example is not intended to limit the scope of the technology.

As a non-limiting example, historical raw data 454 and historical processed data 456 (from historical database 350) are used for processed model training 610. Similar to the processes described in block 506, processed model training 610 may include any number of machine learning methods to generate processed data model 462. For example, processed data 456 may take the form of raw data 454 that has been filtered, smoothed, scaled, normalized, and/or cropped. Accordingly, processed model training 610 may be configured to one or more of those functions (filtering, smoothing, scaling, etc.) to aid in producing generated data that is most similar to processed data 456. Processed model training 610 further fine tunes the parameters of the provided functions to minimize the differences between the (existing) processed data 456 and the generated processed data 776.

Once processed model training 610 has been performed enough to allow for the creation of generated processed data 776 that is sufficiently similar to processed data 456, processed data model 462 is placed in model database 360. In turn, processed data generator 472 is created to provide an interface to use processed data model 462.

As a non-limiting example, historical processed data 456 and historical recommendation data 458 (from historical database 350) are used for recommendation model training 620. Similar to the processes described in block 506, recommendation model training 620 may include any number of machine learning methods to generate recommendation data model 464. For example, recommendation data 458 may take the form of processed data 456 that has been analyzed to generate proposals for operations to perform and equipment to use at the drilling environment (as well as the actions that were actually performed at the drilling environment). Thus, recommendation model training 620 may be configured using a multilayer perceptron neural network for complex classification to produce generated data that is most similar to recommendation data 458. Recommendation model training 620 further fine tunes the parameters of the neural network to minimize the differences between the (existing) recommendation data 458 and the generated recommendation data 778.

Once recommendation model training 620 has been performed enough to allow for the creation of generated recommendation data 778 that is sufficiently similar to recommendation data 458, recommendation data model 464 is placed in model database 360. In turn, recommendation data generator 474 is created to provide an interface to use recommendation data model 464.

As a non-limiting example, historical recommendation data 458 and historical formatted data 460 (from historical database 350) are used for formatted model training 630. Similar to the processes described in block 506, formatted model training 630 may include any number of machine learning methods to generate formatted data model 466. For example, formatted data 460 may take the form of recommendation data 458 that has been organized and formatted to provide a report in a format expected by a human reader. Thus, formatted model training 630 may be configured using a convolutional neural network (CNN) for natural language processing and a recurrent neural network (RNN) for image captioning to produce generated data that is most similar to formatted data 460. Formatted model training 630 further fine tunes the parameters of the neural networks to minimize the differences between the (existing) formatted data 460 and the generated formatted data 780.

Once formatted model training 630 has been performed enough to allow for the creation of generated formatted data 780 that is sufficiently similar to formatted data 460, formatted data model 466 is placed in model database 360. In turn, formatted data generator 476 is created to provide an interface to use formatted data model 466.

Sequential data generator 370 is then created by combining processed data generator 472, recommendation data generator 474, and formatted data generator 476 into a single linked process. Specifically, as shown in FIG. 6, sequential data generator 370 is configured such that, when provided input data, that data is passed to (i) processed data generator 472, then to (ii) recommendation data generator 474, then lastly to (iii) formatted data generator 476, to produce output data that has been processed by each of those three data generators.

FIG. 7

Figure 7:
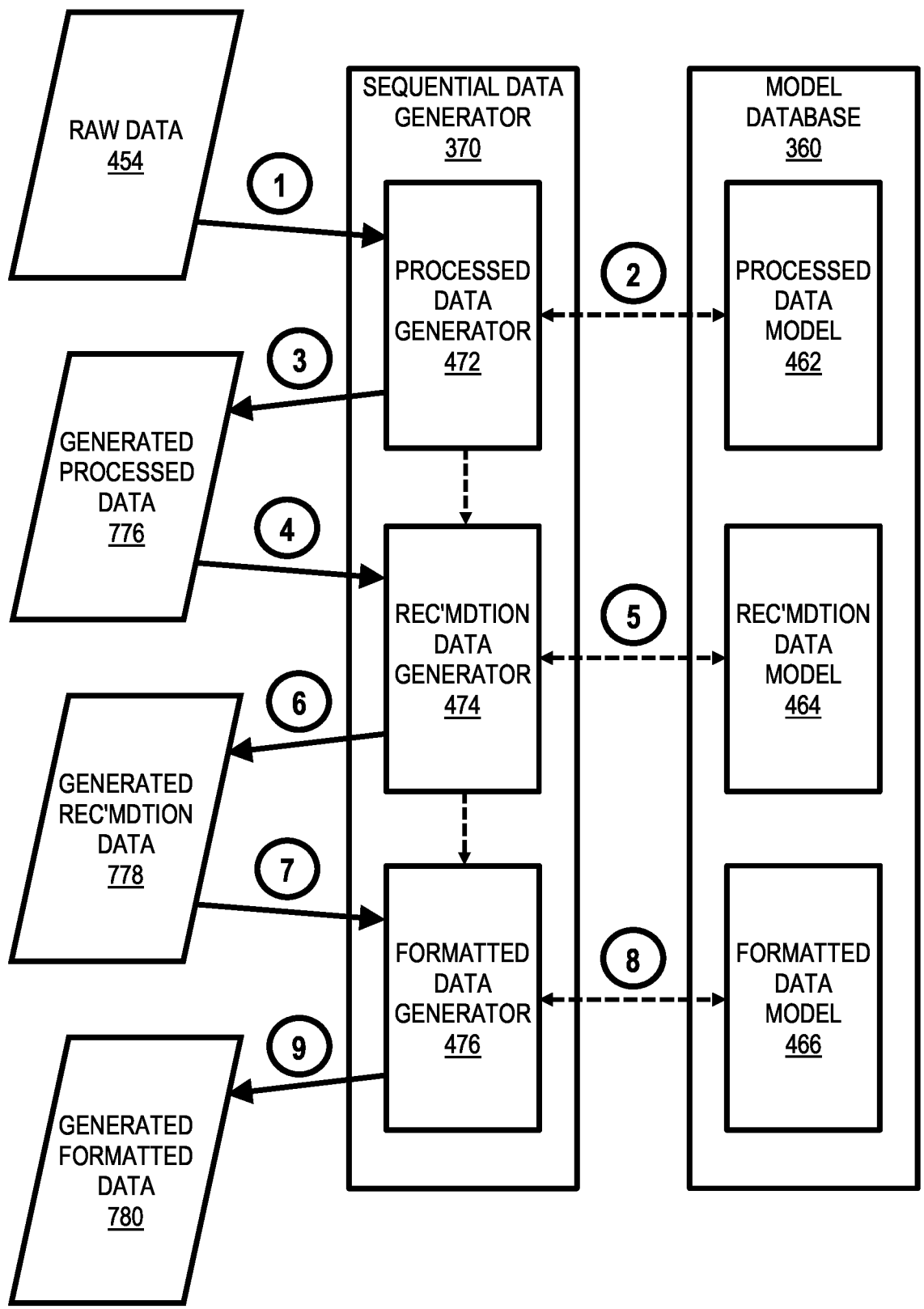
FIG. 7 is a diagram of an example of a system and method for using a sequential data generator to create generated formatted data.

FIG. 7 is a diagram of an example of a system and method for using a sequential data generator to create generated formatted data. The example is not intended to limit the scope of the technology.

At (1), raw data 454 is provided to sequential data generator 370 as input data. In turn, sequential data generator 370 passes raw data 454 to processed data generator 472 (the first data generator in the sequence of data generators).

At (2) processed data generator 472 uses processed data model 462 (in model database 360) to create generated processed data 776.

At (3), processed data generator 472 outputs generated processed data 776 and stores it in a designated location.

At (4), sequential data generator 370 passes generated processed data 776 to recommendation data generator 474 as input data (the second data generator in the sequence of data generators).

At (5) recommendation data generator 474 uses recommendation data model 464 (in model database 360) to create generated recommendation data 778.

At (6), recommendation data generator 474 outputs generated recommendation data 778 and stores it in a designated location.

At (7), sequential data generator 370 passes generated recommendation data 778 to formatted data generator 476 as input data (the third and final data generator in the sequence of data generators).

At (8) formatted data generator 476 uses formatted data model 466 (in model database 360) to create generated formatted data 780.

At (9) formatted data generator 476 outputs generated formatted data 780 and stores it in a designated location. In turn, a user of the system may view generated formatted data 780 to review the formatted recommendations therein.

Solutions and Improvements

The methods and systems described above are an improvement over the current technology as the methods and systems described herein provide a more efficient method of generating formatted data. Specifically, the formatted data may be generated entirely (or mostly) automatically by a sequential data generator, thereby significantly reducing human input required to generate the same documents. Further, as human input may be reduced, the formatted data is less likely to include mistakes introduced by humans. Thus, using the systems and methods disclosed herein, formatted data may be (i) generated more quickly (ii) at significantly reduced cost, while (iii) being of higher quality.

Statements

The systems and methods may comprise any of the various features disclosed herein, comprising one or more of the following statements.

Statement 1: A method for creating generated formatted data, comprising: receiving, by a sequential data generator, raw data, wherein the raw data comprises formation data at a drilling environment; processing the raw data to obtain generated recommendation data, wherein the generated recommendation data comprises a proposed drilling location; and creating the generated formatted data, wherein the generated formatted data comprises the generated recommendation data.

Statement 2: The method of statement 1, wherein after creating the generated formatted data, the method further comprises: providing the generated formatted data to a user of the sequential data generator.

Statement 3: The method of statements 1 or 2, wherein the sequential data generator comprises a processed data generator, and wherein processing the raw data to obtain the generated recommendation data uses the processed data generator.

Statement 4: The method of statement 3, wherein the processed data generator uses a processed data model.

Statement 5: The method of statement 4, wherein prior to receiving the raw data, the processed data model was trained using historical raw data.

Statement 6: The method of statement 5, wherein the processed data model comprises a neural network.

Statement 7: The method of statement 3, wherein the sequential data generator further comprises a recommendation data generator, and wherein processing the raw data to obtain the generated recommendation data further uses the recommendation data generator.

Statement 8: The method of statement 7, wherein the recommendation data generator uses a recommendation data model.

Statement 9: The method of statement 8, wherein prior to receiving the raw data, the recommendation data model was trained using historical recommendation data.

Statement 10: The method of statement 9, wherein the recommendation data model comprises a neural network.

Statement 11: An information handling system, comprising: memory; and a processor, wherein the processor is configured execute a method for creating generated formatted data, comprising: receiving, by a sequential data generator, raw data, wherein the raw data comprises formation data at a drilling environment; processing the raw data to obtain generated recommendation data, wherein the generated recommendation data comprises a proposed drilling location; and creating the generated formatted data, wherein the generated formatted data comprises the generated recommendation data.

Statement 12: The information handling system of statement 11, wherein after creating the generated formatted data, the method further comprises: providing the generated formatted data to a user of the sequential data generator.

Statement 13: The information handling system of statements 11 or 12, wherein the sequential data generator comprises a processed data generator, and wherein processing the raw data to obtain the generated recommendation data uses the processed data generator.

Statement 14: The information handling system of statement 13, wherein the processed data generator uses a processed data model.

Statement 15: The information handling system of statement 14, wherein prior to receiving the raw data, the processed data model was trained using historical raw data.

Statement 16: The information handling system of statement 15, wherein the processed data model comprises a neural network.

Statement 17: The information handling system of statement 13, wherein the sequential data generator further comprises a recommendation data generator, and wherein processing the raw data to obtain the generated recommendation data further uses the recommendation data generator.

Statement 18: The information handling system of statement 17, wherein the recommendation data generator uses a recommendation data model.

Statement 19: The information handling system of statement 18, wherein prior to receiving the raw data, the recommendation data model was trained using historical recommendation data.

Statement 20: The information handling system of statement 19, wherein the recommendation data model comprises a neural network.

General Notes

As it is impracticable to disclose every conceivable embodiment of the technology described herein, the figures, examples, and description provided herein disclose only a limited number of potential embodiments. One of ordinary skill in the art would appreciate that any number of potential variations or modifications may be made to the explicitly disclosed embodiments, and that such alternative embodiments remain within the scope of the broader technology. Accordingly, the scope should be limited only by the attached claims. Further, the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the elements that it introduces. Certain technical details, known to those of ordinary skill in the art, may be omitted for brevity and to avoid cluttering the description of the novel aspects.

For further brevity, descriptions of similarly named components may be omitted if a description of that similarly named component exists elsewhere in the application. Accordingly, any component described with respect to a specific figure may be equivalent to one or more similarly named components shown or described in any other figure, and each component incorporates the description of every similarly named component provided in the application (unless explicitly noted otherwise). A description of any component is to be interpreted as an optional embodiment—which may be implemented in addition to, in conjunction with, or in place of an embodiment of a similarly-named component described for any other figure.

Lexicographical Notes

As used herein, adjective ordinal numbers (e.g., first, second, third, etc.) are used to distinguish between elements and do not create any particular ordering of the elements. As an example, a "first element" is distinct from a "second element", but the "first element" may come after (or before) the "second element" in an ordering of elements. Accordingly, an order of elements exists only if ordered terminology is expressly provided (e.g., "before", "between", "after", etc.) or a type of "order" is expressly provided (e.g., "chronological", "alphabetical", "by size", etc.). Further, use of ordinal numbers does not preclude the existence of other elements. As an example, a "table with a first leg and a second leg" is any table with two or more legs (e.g., two legs, five legs, thirteen legs, etc.). A maximum quantity of elements exists only if express language is used to limit the upper bound (e.g., "two or fewer", "exactly five", "nine to twenty", etc.). Similarly, singular use of an ordinal number does not imply the existence of another element. As an example, a "first threshold" may be the only threshold and therefore does not necessitate the existence of a "second threshold".

As used herein, the word "data" may be used as an "uncountable" singular noun—not as the plural form of the singular noun "datum". Accordingly, throughout the application, "data" is generally paired with a singular verb (e.g., "the data is modified"). However, "data" is not redefined to mean a single bit of digital information. Rather, as used herein, "data" means any one or more bit(s) of digital information that are grouped together (physically or logically). Further, "data" may be used as a plural noun if context provides the existence of multiple "data" (e.g., "the two data are combined").

As used herein, the term "operative connection" (or "operatively connected") means the direct or indirect connection between devices that allows for interaction in some way (e.g., via the exchange of information). For example, the phrase 'operatively connected' may refer to a direct connection (e.g., a direct wired or wireless connection between devices) or an indirect connection (e.g., multiple wired and/or wireless connections between any number of other devices connecting the operatively connected devices).

What is claimed is:

1. A method for creating generated formatted data, comprising:
    receiving, by a sequential data generator, raw data,
        wherein the sequential data generator comprises a large language model,
        wherein the raw data comprises formation data, and
        wherein the formation data is acquired from a drilling environment;
    processing the raw data to obtain generated recommendation data,
        wherein the generated recommendation data comprises a proposed drilling location based on the formation data; and
    creating the generated formatted data,
        wherein the generated formatted data comprises the generated recommendation data and a visualization of, at least part of, the formation data.

2. The method of claim 1, wherein after creating the generated formatted data, the method further comprises:
    providing the generated formatted data to a user of the sequential data generator.

3. The method of claim 1,
    wherein the sequential data generator comprises a processed data generator, and
    wherein processing the raw data to obtain the generated recommendation data uses the processed data generator.

4. The method of claim 3, wherein the processed data generator uses a processed data model.

5. The method of claim 4, wherein prior to receiving the raw data, the processed data model was trained using historical raw data.

6. The method of claim 5, wherein the processed data model comprises a neural network.

7. The method of claim 3,
    wherein the sequential data generator further comprises a recommendation data generator, and
    wherein processing the raw data to obtain the generated recommendation data further uses the recommendation data generator.

8. The method of claim 7, wherein the recommendation data generator uses a recommendation data model.

9. The method of claim 8, wherein prior to receiving the raw data, the recommendation data model was trained using historical recommendation data.

10. The method of claim 9, wherein the recommendation data model comprises a neural network.

11. An information handling system, comprising:
  memory; and
  a processor, wherein the processor is configured execute a method for creating generated formatted data, comprising:
    receiving, by a sequential data generator, raw data,
      wherein the sequential data generator comprises a large language model,
      wherein the raw data comprises formation data, and
      wherein the formation data is acquired from a drilling environment;
    processing the raw data to obtain generated recommendation data,
      wherein the generated recommendation data comprises a proposed drilling location based on the formation data; and
    creating the generated formatted data,
      wherein the generated formatted data comprises the generated recommendation data and a visualization of, at least part of, the formation data.

12. The information handling system of claim 11, wherein after creating the generated formatted data, the method further comprises:
  providing the generated formatted data to a user of the sequential data generator.

13. The information handling system of claim 11,
  wherein the sequential data generator comprises a processed data generator, and
  wherein processing the raw data to obtain the generated recommendation data uses the processed data generator.

14. The information handling system of claim 13, wherein the processed data generator uses a processed data model.

15. The information handling system of claim 14, wherein prior to receiving the raw data, the processed data model was trained using historical raw data.

16. The information handling system of claim 15, wherein the processed data model comprises a neural network.

17. The information handling system of claim 13,
  wherein the sequential data generator further comprises a recommendation data generator, and
  wherein processing the raw data to obtain the generated recommendation data further uses the recommendation data generator.

18. The information handling system of claim 17, wherein the recommendation data generator uses a recommendation data model.

19. The information handling system of claim 18, wherein prior to receiving the raw data, the recommendation data model was trained using historical recommendation data.

20. The information handling system of claim 19, wherein the recommendation data model comprises a neural network.

* * * * *